(12) United States Patent
Josefiak et al.

(10) Patent No.: US 9,319,837 B2
(45) Date of Patent: Apr. 19, 2016

(54) CREATION OF A GEOFENCE BASED ON MOVEMENT DATA AND A DIGITAL MAP

(71) Applicant: DEUTSCHE POST AG, Bonn (DE)

(72) Inventors: Frank Josefiak, Bonn (DE); Filip Petkov, Cologne (DE)

(73) Assignee: DEUTSCHE POST AG, Bonn (DE)

( * ) Notice: Subject to any disclaimer, the term of this patent is extended or adjusted under 35 U.S.C. 154(b) by 0 days.

(21) Appl. No.: 14/417,121

(22) PCT Filed: Jul. 4, 2013

(86) PCT No.: PCT/EP2013/064115
§ 371 (c)(1),
(2) Date: Jan. 23, 2015

(87) PCT Pub. No.: WO2014/016096
PCT Pub. Date: Jan. 30, 2014

(65) Prior Publication Data
US 2015/0215736 A1    Jul. 30, 2015

(30) Foreign Application Priority Data

Jul. 23, 2012 (EP) .................................. 12177524

(51) Int. Cl.
*H04W 4/02* (2009.01)
*G01C 21/32* (2006.01)
*G06Q 10/08* (2012.01)
*H04W 4/04* (2009.01)

(52) U.S. Cl.
CPC ............... *H04W 4/021* (2013.01); *G01C 21/32* (2013.01); *G06Q 10/08* (2013.01); *H04W 4/022* (2013.01); *H04W 4/046* (2013.01)

(58) Field of Classification Search
CPC ....... G01C 21/32; G06Q 10/08; H04W 4/021; H04W 4/046; H04W 4/022
USPC .................. 455/456.1, 456.3, 456.6; 370/252
See application file for complete search history.

(56) References Cited

U.S. PATENT DOCUMENTS

2012/0008526 A1   1/2012  Borghei
2012/0172027 A1   7/2012  Partheesh et al.
2013/0324160 A1*  12/2013 Sabatellil .............. H04W 4/022
                                              455/456.3

FOREIGN PATENT DOCUMENTS

EP           1 557 807 A2    1/2005
WO      WO 2011/000060 A1   1/2011
WO      WO 2011/057273 A1   5/2011

OTHER PUBLICATIONS

International Search Report in related application No. PCT/EP2013/064115, dated Jan. 23, 2015 (4 pgs), including English translation (3 pgs.); 7 pgs. total.

(Continued)

*Primary Examiner* — Sam Bhattacharya
(74) *Attorney, Agent, or Firm* — Knobbe Martens Olson & Bear LLP (57) ABSTRACT

The invention relates to a method for automatically creating a geofence (1), comprising the following steps: detecting a starting position; transferring the starting position to a digital map; automatically creating an area object on the digital map, wherein the area object comprises the starting position; detecting movement data of at least one moveable object in the region of the area object; and automatically reducing the area object to form the geofence (1), on the basis of the movement data.

20 Claims, 4 Drawing Sheets

(56) References Cited

OTHER PUBLICATIONS

Written Opinion in related application No. PCT/EP2013/064115, dated Jan. 30, 2014 (5 pgs), including English translation (7 pgs.); 12 pgs. total.

Prosecution of related EP application No. EP12177524, including Search Report and Written Opinion dated Jan. 9, 2013, (6 pgs,) and Response filed after receipt of the Search Report, dated Jul. 29, 2014 (10 pgs.);16 pages total.

* cited by examiner

CREATION OF A GEOFENCE BASED ON MOVEMENT DATA AND A DIGITAL MAP

CROSS REFERENCE TO RELATED APPLICATION

This application is a U.S. National Stage Application of International Application No. PCT/EP2013/064115 filed Jul. 4, 2013 published as WO2014/016096, which claims priority from European Patent Application No. 12177524.1, filed Jul. 23, 2012, published as EP2690404(A1) which are incorporated herein by reference in entirety.

The present invention relates to a method for automatically creating a geofence. The invention also relates to a digital storage medium with electronically readable control signals, wherein the control signals can cooperate with a data processing device, such that the above method is executed. The invention additionally relates to a computer program product with a program code, stored on a machine-readable carrier, for carrying out the above method when the program code is executed on a data processing device. The invention also relates to a computer program with program code for carrying out the above method when the program runs on a data processing device.

A geofence can be understood to be any closed geographical region. The region can be both a two-dimensional region on a map, for example a petrol station site or a car park at a logistics yard, or also a three-dimensional region, for example an airport with a flight approach path or a flight corridor. In principle, a geofence may also comprise an entire country or a continent. For example, geofences have major effects in the field of logistics, where they can influence the planning of routes and also the support of critical processes and procedures. In principle, geofences assist the tracking of all arbitrary objects. In logistics, geofences are used for example for the marking of regions which are of great importance for dispatchers or enable the tracking of transport means (assets) or transport goods (shipments) in these regions. To this end, different notifications can be defined and sent to an arbitrary group of recipients by means of digital geofences on the basis of different events, which for example include the entry or non-entry into the geofence, the exit or the non-exit from the geofence, a length of stay in the geofence or the arrival/non-arrival at a geofence in a certain time window. These notifications may include messages such as "a lorry has entered a critical area" or "a ship has left the port".

Until today, geofences were defined manually. To this end, for example, boundaries are drawn manually on a map and define the geofence, which involves a very high level of effort and therefore cost. Geofences are defined and stored with the aid of position data, for example degree of longitude and degree of latitude. The geofences are then stored digitally for the application.

In particular if many geofences are to be created, the manual method for the creation of geofences is unsuitable due to the high effort involved. All identified geopositions have to be searched for on the map and manually adapted. The starting positions may be defined for example by petrol stations, airports, ports, distribution centres or the like, or equally by countries or cities. An individual authorised to create a geofence has to retrieve the starting position on a map, then visually identify on the map the boundaries for the geofence and manually create the boundaries of the geofence. An additional problem may lie in the fact that the starting position may be incomplete or defective, whereby, starting from the map, an unsuitable geofence may be produced. Since the geofence is created on the basis of the map, the geofence may be dependent on a selected map. The geofence may thus vary depending on different maps used.

Proceeding from the above-mentioned prior art, the object of the invention is therefore to specify a method for creating a geofence that enables automatic creation of geofences, is easily applied, provides geofences having high accuracy, and has an error tolerance with respect to defective starting positions.

The object is achieved in accordance with the invention by the features of the independent claims. Advantageous embodiments of the invention are specified in the dependent claims.

In accordance with the invention, a method for automatically creating a geofence is thus provided, comprising the following steps: detecting a starting position; transferring the starting position to a digital map; automatically creating an area object on the digital map, wherein the area object comprises the starting position; detecting movement data of at least one movable object in the region of the area object; and automatically reducing the area object to form the geofence, on the basis of the movement data.

In accordance with the invention, a digital storage medium with electronically readable control signals is also specified, wherein the control signals can cooperate with a data processing device such that the above method is executed.

In accordance with the invention, a computer program product with a program code, stored on a machine-readable carrier, for carrying out the above method when the program code is executed on a data processing device is also specified.

In accordance with the invention, a computer program with a program code for carrying out the above method when the program runs on a data processing device is also specified.

The basic concept of the present invention is thus to enable an automatic generation of the geofence by the detection of movement data of at least one movable object. This method is therefore well suited in particular for the generation of a plurality of geofences. Due to the movement data, the geofence can be produced additionally with a high level of accuracy. This method also has a high tolerance with respect to an inaccurate and even an incorrect starting position, since the geofence can be created in an exact manner independently and without further consideration of the starting position, at least within the area object by means of the movement data. Due to the use of movement data of a plurality of movable objects or of one movable object which has moved a number of times in the region of the area object, the geofence can be created in a very detailed manner.

A movable object can be any object of which the movement can be detected. By way of example the movable objects can be arbitrary transportation means which have a GPS receiver and are configured to transmit their position during operation. The transportation means can include passenger cars, lorries, buses, ships and the like. In principle, the movable objects however can also be independent of the transportation means and merely carried thereby, for example a mobile telephone having a GPS receiver. However, the movement data can also be detected by an external monitoring of the movable objects. The previously mentioned mobile telephones for example can be monitored by the network operator, such that the position of said mobile telephones can be determined via GSM triangulation, via cell tracking and/or via WLAN tracking. Vehicles can also be identified via a unique identifier, for example the registration plate thereof, which is read at predefined positions, wherein at the same time the speed of the vehicle can be detected, for example. Movement data of the at least one movable object in the region of the area object can be detected in principle at any moment in time. The detection can be performed globally by monitoring the movable objects permanently. For creation of the geofence, movement data concerning the area object are then selected.

Here, the digital map can be formed as an abstract representation in the manner of a road map, a terrain map or the like, or as a realistic representation in the manner of a satellite photo or a combination thereof. In principle, the area object can have any shape. The area object preferably has a geometric standard shape, for example a circle, a triangle, a square or the like. The starting position is particularly preferably the centre of the area object. The movement data include a position of the respective movable object. In addition, the movement data may comprise a speed and/or a movement direction of the respective movable object. Speed and direction of the respective movable object can be determined alternatively from a chronological sequence of position data.

The method is a digital method that is usually carried out with a data processing device, for example a computer.

In an advantageous embodiment of the invention, the method is developed in such a way that the step of automatically reducing the area object to form the geofence includes the identification of regions that are comprised by the geofence. In other words, there is a positive identification of regions of the area object that belong to the geofence. Here, different methods for positive identification are possible. Regions in which the at least one movable object has stopped are preferably added to the geofence. Regions in which the at least one movable object has moved with at least one predefined limit speed are particularly preferably added to the geofence. By way of example, a limit speed of more than 60 km/h may indicate a motorway, and therefore the regions in which the at least one movable object has moved at a speed of 80 km/h typical for lorries are added to the geofence, for example when the geofence concerns the motorway. Alternatively, other limit speeds can be selected, for example 0 km/h for a movement, 7 km/h for a walking speed, 30 km/h or 50 km/h for speeds in a town, 60 km/h for a country road, 80 km/h for a motorway or 90 km/h for an overshoot of the permitted speed in the case of a lorry. A corridor with an upper and a lower limit speed is further preferably formed.

In an advantageous embodiment of the invention, the method is developed in such a way that the step of automatically reducing the area object to form the geofence includes the identification of regions outside the geofence. In other words, regions of the area object that do not belong to the geofence are negatively identified. Various methods for the negative identification are possible here. Regions in which the at least one movable object has not stopped preferably are not comprised by the geofence. Regions in which the at least one movable object has moved with at least one predefined limit speed particularly preferably are not comprised by the geofence. By way of example, a limit speed of more than 60 km/h may indicate a motorway, and therefore the regions in which the at least one movable object has moved with a speed, typical for lorries, of 80 km/h are not comprised by the geofence when the geofence for example concerns a motorway services petrol station. Alternatively, other limit speeds can be selected, for example 0 km/h for a movement, 7 km/h for a walking speed, 30 km/h or 50 km/h for speeds in a town, 60 km/h for a country road, 80 km/h for a motorway or 90 km/h for an overshoot of the permitted speed in the case of a lorry. A corridor with an upper and a lower limit speed is further preferably formed.

In an advantageous embodiment of the invention, the method is developed in such a way that the step of detecting movement data of at least one movable object in the region of the area object includes generating a movement profile of the at least one movable object, and the step of automatically reducing the area object to form the geofence on the basis of the movement data includes analysing the movement profile of the at least one movable object. The movement profiles may comprise local regions, such as stretches of road or areas, speeds and/or chronological sequences. By means of the analysis of movement data, a petrol station next to a motorway for example can be identified in order to form a geofence. The geofence then comprises the region that was present in the previously created geofence, plus the regions in the area object in which the movable objects experience a speed reduction to zero and stop for at least 60 seconds. This corresponds to the region of the motorway services petrol station itself. Regions in which the speed around the stopping point was less than 7 km/h are added to the geofence as entry and exit. A further developed movement profile for the petrol station can include the slow reduction of the speed to zero, a subsequent standstill with a predefined duration, and a subsequent acceleration. The petrol station can thus be reliably differentiated from a resting place, at which the length of stay is usually longer than the predefined period. The allocation of a movable object to a geofence is thus possible with a high level of reliability.

In an advantageous embodiment of the invention, the method is developed in such a way that the method comprises the step of detecting a position type for the starting position, and the step of automatically reducing the area object to form the geofence on the basis of the movement data includes the evaluation of the movement data depending on the position type. Different geofences, which can be determined differently by the movement data, can be applied for starting positions. As mentioned previously, a motorway can be detected by a speed of the at least one movable object greater than 60 km/h, whereas in a city region the speed is limited to 50 km/h. Different types of movable objects may also move differently. In a port, ships usually move only with few, slow changes of direction, whereas land vehicles have a higher speed with quick changes of direction. Accordingly, a harbour basin can be easily identified for example on the basis of a corresponding movement profile in order to create a geofence.

In an advantageous embodiment of the invention, the method is developed in such a way that the method comprises the step of detecting a position type for the starting position, and the step of automatically creating an area object on the digital map includes the creation of the area object depending on the position type. The area object can thus be adapted on the one hand in order to accelerate the generation of the geofence in that no irrelevant regions are processed, and on the other hand the omission of relevant regions is avoided. By way of example, a geofence for a petrol station is usually smaller than one for a container port. In each case, a uniform area object is preferably used, of which the size is selected depending on the position type. Alternatively or additionally, the shape of the area object can be selected depending on the position type.

In an advantageous embodiment of the invention, the method is developed in such a way that the step of detecting a starting position includes receiving a geographical specification. The geographical specification can be formed in different ways, for example as a coordinate pair for direct allocation on the map. By way of example, a location of a movable object at a certain moment in time can be detected as a starting position.

In an advantageous embodiment of the invention, the method is developed in such a way that the step of receiving a geographical specification includes receiving an abstract map specification and converting the abstract map specification into the starting position. By way of example, the abstract map specification may be an address or a landmark. By way of example, an address can be recalculated by a "reverse address service" into position data for the starting position. The starting position is thus preferably defined initially without use of the map. A plurality of geofences can be easily created on the basis of an automatic reading in of a plurality of addresses, since a manual detection of the starting position is omitted.

In an advantageous embodiment of the invention, the method is developed in such a way that the step of detecting a starting position includes selecting a point of interest. The points of interest (POI) usually comprise a geographical specification, which can be easily used as a starting position or can be converted into a starting position, and usually a position type, for example "petrol station". A wide range of POIs is available, such that geofences can be created with little effort with use of such available information.

In an advantageous embodiment of the invention, the method is developed in such a way that the step of automatically creating an area object on the digital map includes automatically generating the area object on the map on the basis of map contents. The area object can thus be created already with a good level of accuracy, and the effort for the reduction to form the geofence is low. The map contents may be different contents depending on the map used. Generally, the map contents can differ via differently coloured configurations, for example blue for a sea or river. A road or a building may also each have a different colour, whereby these regions can be differentiated automatically.

In an advantageous embodiment of the invention, the method is developed in such a way that the step of automatically generating the area object on the map on the basis of map contents comprises the following steps: detecting a map colour at the starting position; detecting a first delimitation point of the area object by the detection of the change in colour of the map on the basis of the map colour at the starting position; detecting at least one further delimitation point of the area object by the detection of the change in colour of the map on the basis of the map colour at the starting position at a predefined distance from the respective previous delimitation point; generating the area object by connecting the delimitation points. As a result of this method, the area object is defined by the colour change on the map, starting from the colour of the starting position. The method can be carried out for a different number of delimitation points depending on a desired accuracy of the geofence. Alternatively, other methods can also be applied.

In an advantageous embodiment of the invention, the method is developed in such a way that the step of automatically generating the area object on the map on the basis of map contents includes automatically creating a delimitation object on the digital map, wherein the delimitation object comprises the starting position, and the step of determining a limit of the area object by extensive detection of the change in colour of the map is limited to the delimitation object. The delimitation object can be a geometric object, for example a circle or a square, in which the starting position is located, such that the automatic generation of the area object on the map can be limited to the geometric object. However, an extension of the geometric object to the area object is also possible in principle.

The invention will be explained in greater detail hereinafter with reference to the accompanying drawing on the basis of preferred embodiments.

In the drawing.

Figure 1:
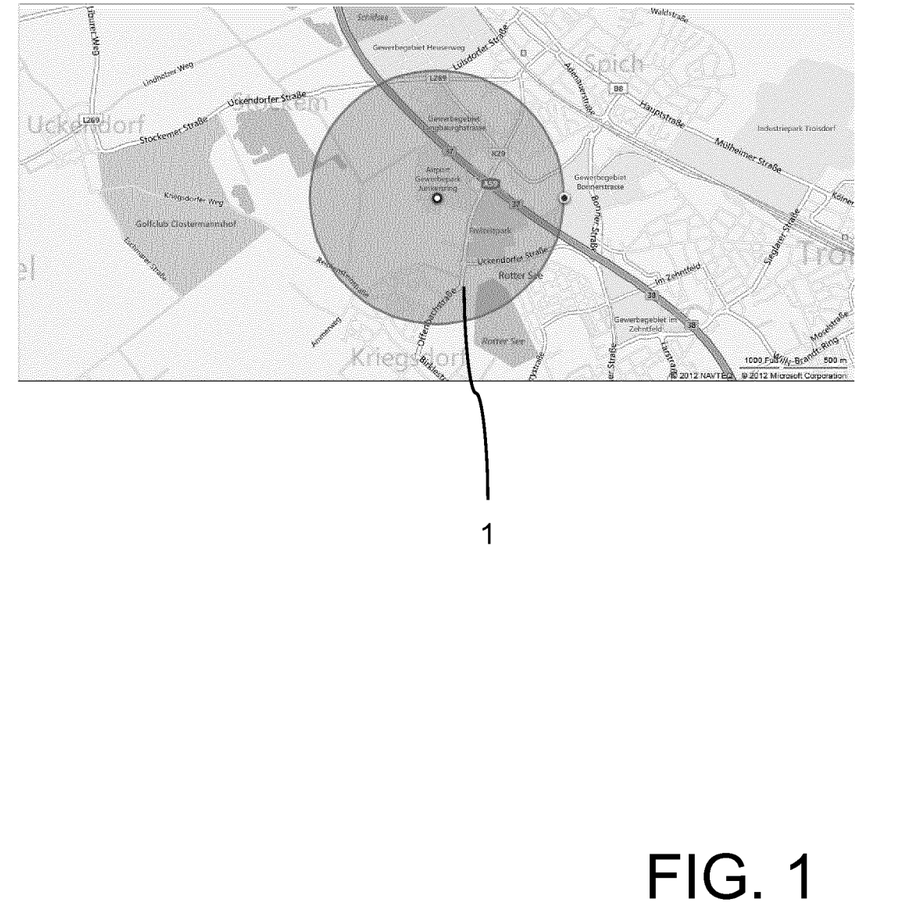
FIG. 1 shows a view of a geofence as a circle.
Figure 2:
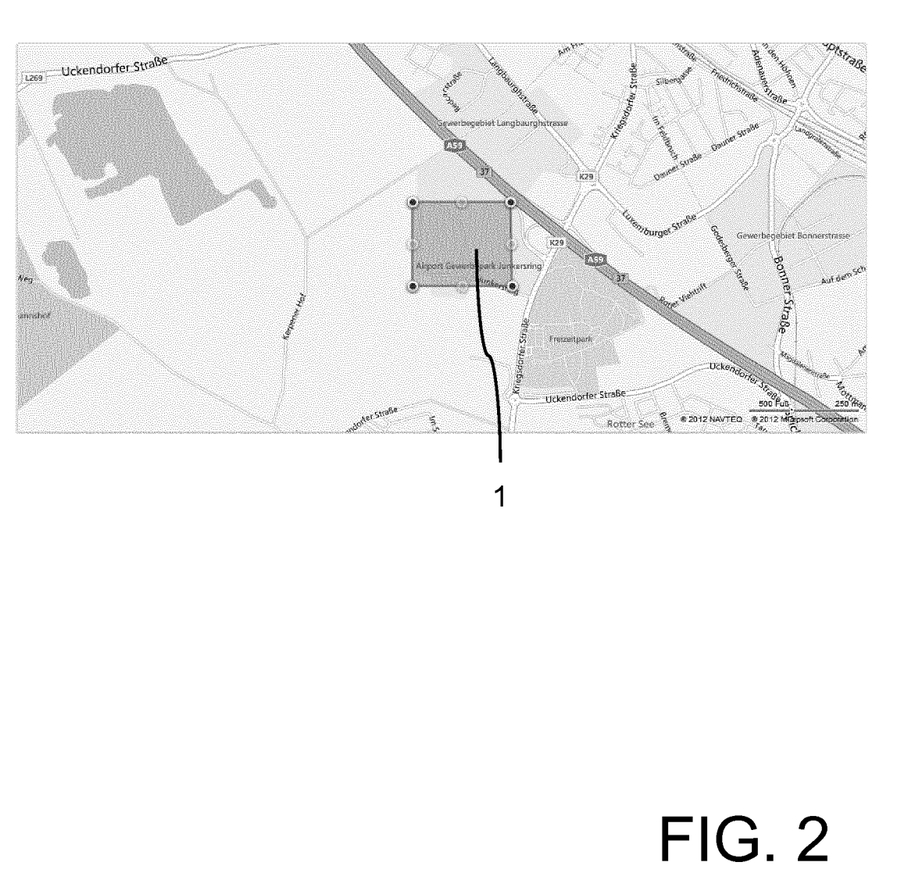
FIG. 2 shows a vies of a geofence as a square.
Figure 3:
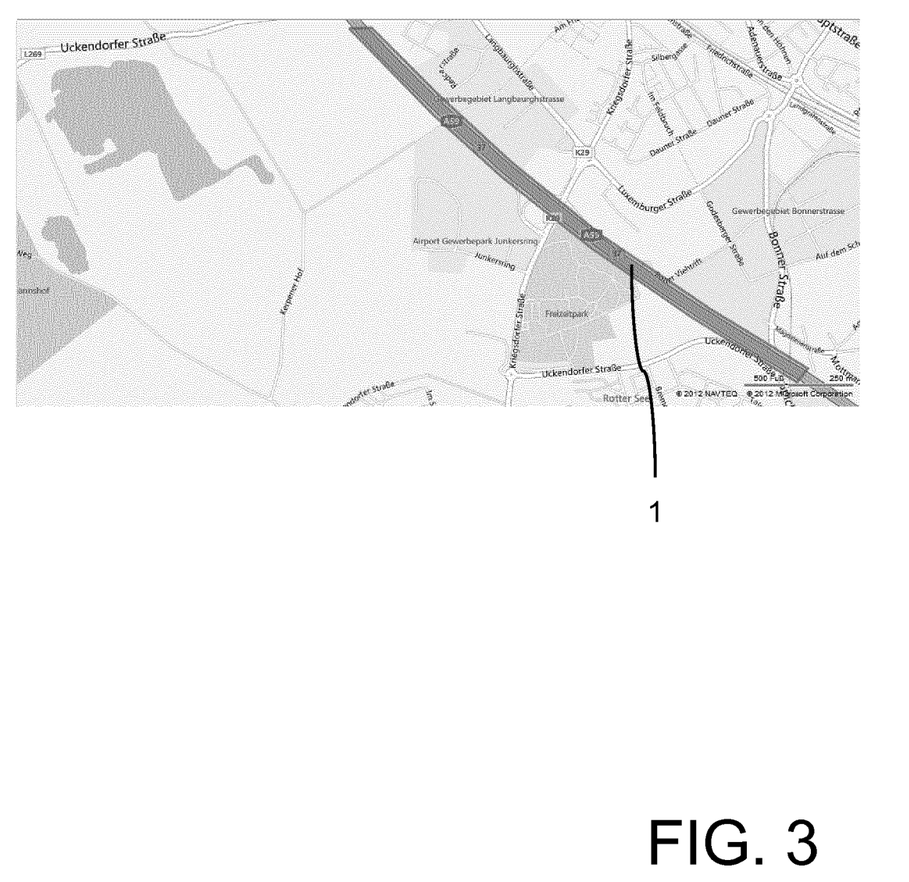
FIG. 3 shows a view of a geofence as a road.
Figure 4:
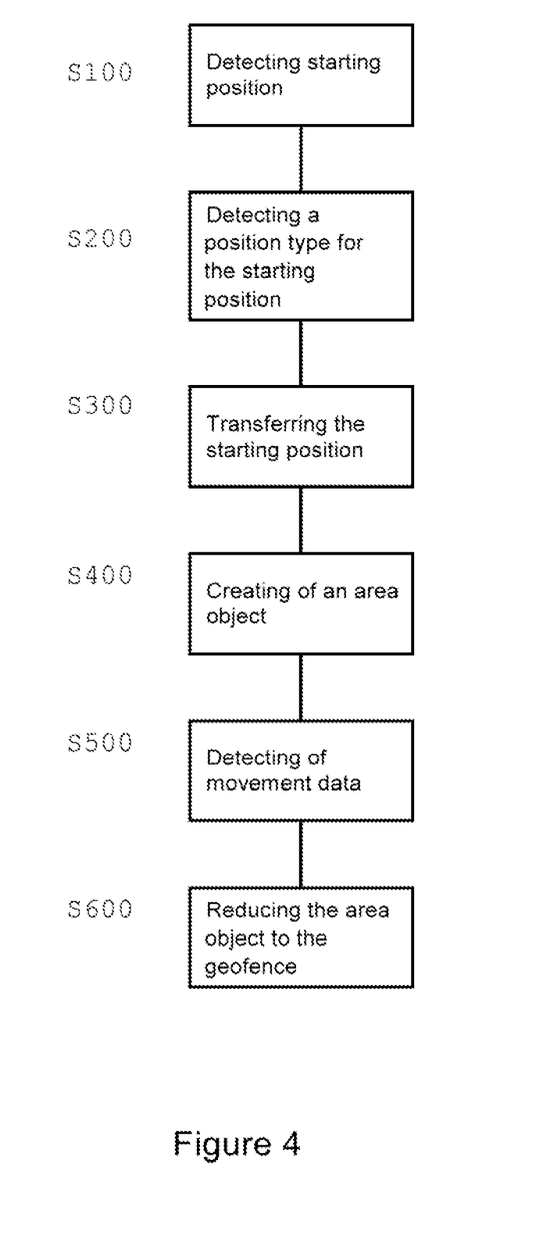
FIG. 4 shows a flow diagram for carrying out the method according to the invention.

FIG. 4 shows a sequence of the method according to the invention for automatically creating a geofence 1. Different geofences 1 are shown in FIGS. 1 to 3.

The method starts in step S100 with the detection of a starting position. Accordingly, a geographical specification is received, which in this exemplary embodiment as abstract map specification is an address. The address is converted by a "reverse address service" into position data in the form of a coordinate pair for the starting position.

In step S200, a position type for the starting position is detected. The detection of the position type includes a user input. The starting position in this exemplary embodiment is defined as belonging to a motorway services petrol station, and therefore the position type is "motorway services petrol station".

In an alternative exemplary embodiment, steps S100 and S200 are combined. Accordingly, a "point of interest" (POI) with a geographical specification that corresponds to the starting position and also a position type are selected.

In Step S300, the starting position is transferred to a digital map. Here, the coordinate pair defining the starting position is allocated directly on the map. In this exemplary embodiment, the digital map contains an abstract representation in the form of a road map.

Step S400 comprises the automatic creation of an area object on the digital map, wherein the area object comprises the starting position. In this exemplary embodiment, the area object has the shape of a circle, wherein the starting position is the centre of the circle. Depending on the object type, the circle has a different radius r, for example for a car park r=5 m, for a petrol station r=50 m, for a depot r=700 m, or for an airport r=3000 m.

For the method, movement data is detected by permanently monitoring the movable objects. In this exemplary embodiment, movable objects are land vehicles that have a GPS receiver and are configured to transmit the movement data thereof during operation for collection at a data processing device. The movement data comprises a chronological sequence of positions of the movable objects, from which the speed of the respective movable objects is determined.

In step S500, movement data of a plurality of movable objects in the region of the area object is detected. Movement data that concerns the area object is selected from the previously detected movement data. Movement profiles that comprise the chronological sequences from braking, stopping and accelerating are generated from the movement data of the movement objects.

In step S600, the area object is automatically reduced to form the geofence on the basis of the movement data. To this end, regions that are comprised by the geofence and regions outside the geofence are identified. Regions in which no movable object has stopped are thus firstly marked as not belonging to the geofence. Furthermore, depending on the object type "motorway services petrol station" selected here, regions in which the movable objects have moved at more than a limit speed of 60 km/h are marked as not belonging to the geofence. Here, a physical distance from the starting position within the area object is irrelevant. Alternatively, the limit speed for other object types can be selected differently, for example 0 km/h for a movement, 7 km/h for a walking speed, 30 km/h or 50 km/h for speeds in a town, 60 km/h for a country road, 80 km/h for a motorway or 90 km/h for an overshoot of the permitted speed in the case of a lorry. In a further alternative embodiment, a corridor with an upper and a lower limit speed is formed.

Movement profiles of the movable objects are additionally generated and analysed. For the object type "motorway services petrol station" used here, the movement profile in this exemplary embodiment includes the slow reduction of the speed to zero, a subsequent standstill with a duration from 1 to 5 minutes, and a subsequent acceleration. The stay at the petrol station can thus be clearly differentiated from a visit to a motorway services restaurant, in which the length of stay is longer. Regions are thus marked as belonging to the geofence in accordance with the movement profile. The geofence is then created by reducing the area object to regions belonging to the geofence.

The method ends with the storage of the geofence.

A method according to an alternative embodiment differs from the previously described method merely in the step S400. Step S400 in accordance with the alternative embodiment comprises the automatic generation of the area object on the map on the basis of map contents.

Accordingly, a delimitation object is firstly created on the digital map, wherein the delimitation object is centred around the starting position. The boundary of area object is then determined in a manner limited to the delimitation object. The delimitation object, similarly to the area object, is a geometric object, which in this exemplary embodiment is a circle. As mentioned above, the radius of the circle is dependent on the object type.

Furthermore, a map colour at the starting position is detected. Starting from the starting position, the map is travelled over in a direction until a first delimitation point, at which there is a change in the colour of the map on the basis of the map colour at the starting position, is reached. Here, only a significant change is considered to be a change in the colour, and therefore merely a minor change, for example from a mid-tone to the same tone but darker, is not considered to constitute a change. Further delimitation points of the area object are then detected, in each case starting from the last reached delimitation point, by detecting the change in colour of the map on the basis of the map colour at the starting position. Here, in each case, a further delimitation point is detected at a predefined distance from the respective previous delimitation point.

This procedure is repeated on the whole until a termination criterion or quality criterion is satisfied. In the case of a geofence with 100 meters diameter ((R=50 m), a total of 8 repetitions are performed here, or the calculation is continued until the distance of the last determined delimitation point from the first delimitation point is less than 12 meters.

As soon as a sufficient number of delimitation points have been detected, the area object is produced by connecting the delimitation points.

The above-described methods are digital methods, which are performed in each case as a computer program on a data processing device. Accordingly, the data processing program is stored on a digital storage medium, here a hard drive. The data processing program comprises electronically readable control signals, which cooperate with the data processing device such that the above method is performed.

The data processing program is formed as a computer program product with a program code, stored on a machine-readable carrier, for execution on the data processing device.

The invention claimed is:

1. A method for automatically creating a geofence, the method comprising:
   detecting a starting position;
   transferring the starting position to a digital map;
   automatically creating an area object on the digital map, wherein the area object comprises the starting position;
   detecting movement data of at least one movable object in the region of the area object, wherein the movement data in addition to a position comprise a speed and/or a movement direction of the respective movable object; and
   automatically reducing the area object to form the geofence, on the basis of the movement data.

2. The method according to claim 1, wherein the step of automatically reducing the area object to form the geofence includes identifying regions that are comprised by the geofence.

3. The method according to claim 2, wherein the step of automatically reducing the area object to form the geofence includes identifying regions outside the geofence.

4. The method according to claim 2, wherein the step of detecting movement data of at least one movable object in the region of the area object includes generating a movement profile of the at least one movable object, and
   wherein the step of automatically reducing the area object to form the geofence on the basis of the movement data includes analysing the movement profile of the at least one movable object.

5. The method according to claim 2, wherein the method comprises the step of detecting a position type for the starting position, and
   wherein the step of automatically reducing the area object to form the geofence on the basis of the movement data includes evaluating the movement data depending on the position type.

6. The method according to claim 2, wherein the method includes the step of detecting a position type for the starting position, and
   wherein the step of automatically creating an area object on the digital map includes creating the area object depending on the position type.

7. The method according to claim 2, wherein the step of detecting a starting position includes receiving a geographical specification.

8. The method according to claim 1, wherein
   the step of automatically reducing the area object to form the geofence includes identifying regions outside the geofence.

9. The method according to claim 1, wherein the step of detecting movement data of at least one movable object in the region of the area object includes generating a movement profile of the at least one movable object, and
   wherein the step of automatically reducing the area object to form the geofence on the basis of the movement data includes analysing the movement profile of the at least one movable object.

10. The method according to claim 1, wherein the method comprises the step of detecting a position type for the starting position, and
    wherein the step of automatically reducing the area object to form the geofence on the basis of the movement data includes evaluating the movement data depending on the position type.

11. The method according to claim 1, wherein the method includes the step of detecting a position type for the starting position, and wherein the step of automatically creating an area object on the digital map includes creating the area object depending on the position type.

12. The method according to claim 1, wherein the step of detecting a starting position includes receiving a geographical specification.

13. The method according to claim 12, wherein the step of receiving a geographical specification includes receiving an abstract map specification and converting the abstract map specification into the starting position.

14. The method according to claim 1, wherein the step of detecting a starting position includes selecting a point of interest.

15. The method according to claim 1, wherein the step of automatically creating an area object on the digital map includes automatically generating the area object on the map, on the basis of map contents.

16. The method according to claim 15, wherein the step of automatically generating the area object on the map on the basis of map contents comprises:
   detecting a map colour at the starting position;
   detecting a first delimitation point of the area object by detecting the change in colour of the map on the basis of the map colour at the starting position;
   detecting at least one further delimitation point of the area object by detecting the change in colour of the map on the basis of the map colour at the starting position at a predefined distance from the respective previous delimitation point,
   generating the area object by connecting the delimitation points.

17. The method according to claim 16, wherein the step of automatically generating the area object on the map on the basis of map contents includes automatically creating a delimitation object on the digital map, wherein the delimitation object comprises the starting position, and
   wherein the step of determining a boundary of the area object by extensive detection of the change in colour of the map is limited to the delimitation object.

18. A non-transitory digital storage medium with electronically readable control signals, which can cooperate with a programmable computer system wherein the method according to claim 1 is executed.

19. A computer product comprising:
   at least one data processing device; and
   one or more computer-readable media including program code, stored on the computer-readable media, for carrying out a method for automatically creating a geofence when the program code is executed on the at least one data processing device, the method comprising:
   detecting a starting position:
   transferring the starting position to a digital map;
   automatically creating an area object on the digital map including automatically generating the area object on the map on the basis of map contents, the area object comprising the starting position, wherein the step of automatically generating the area object on the map on the basis of map contents comprises:
   detecting a map colour at the starting position;
   detecting a first delimitation point of the area object by detecting the change in colour of the map on the basis of the map colour at the starting position:
   detecting at least one further delimitation point of the area object by detecting the change in colour of the map on the basis of the map colour at the starting position at a predefined distance from the respective previous delimitation point, and
   generating the area object by connecting the delimitation points;
   detecting movement data of at least one movable object in the region of the area object, wherein the movement data in addition to a position comprise a speed and/or a movement direction of the respective movable object; and
   automatically reducing the area object to form the geofence, on the basis of the movement data.

20. One or more non-transitory computer-readable media comprising a computer-executable program of instructions including program code for carrying out a method for automatically creating a geofence when the computer-executable program of instructions is executed on at least one data processing device, the method comprising:
   detecting a starting position:
   transferring the starting position to a digital map;
   automatically creating an area object on the digital map including automatically generating the area object on the map on the basis of map contents, the area object comprising the starting position, wherein the step of automatically generating the area object on the map on the basis of map contents comprises:
   detecting a map colour at the starting position;
   detecting a first delimitation point of the area object by detecting the change in colour of the map on the basis of the map colour at the starting position;
   detecting at least one further delimitation point of the area object by detecting the change in colour of the map on the basis of the map colour at the starting position at a Predefined distance from the respective previous delimitation point, and
   generating the area object by connecting the delimitation points;
   detecting movement data of at least one movable object in the region of the area object, wherein the movement data in addition to a position comprise a speed and/or a movement direction of the respective movable object; and
   automatically reducing the area object to form the geofence, on the basis of the movement data.

* * * * *